US012744467B2

(12) United States Patent
Liu et al.

(10) Patent No.: US 12,744,467 B2
(45) Date of Patent: Sep. 22, 2026

(54) SWITCHING POWER SUPPLY DEVICE

(71) Applicant: Murata Manufacturing Co., Ltd., Nagaokakyo (JP)

(72) Inventors: Chuipong Liu, Hong Kong (CN); Siuwai Leung, Hong Kong (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 148 days.

(21) Appl. No.: 18/916,955

(22) Filed: Oct. 16, 2024

(65) Prior Publication Data

US 2025/0125737 A1 Apr. 17, 2025

(30) Foreign Application Priority Data

Oct. 17, 2023 (CN) ........................ 202311345677.4

(51) Int. Cl.

| | |
|---|---|
| ***H02M 1/44*** | (2007.01) |
| ***H02M 1/00*** | (2006.01) |
| ***H02M 1/12*** | (2006.01) |
| ***H02M 3/335*** | (2006.01) |

(52) U.S. Cl.
CPC ..... *H02M 3/33592* (2013.01); *H02M 1/0058* (2021.05); *H02M 1/123* (2021.05); *H02M 1/126* (2013.01); *H02M 1/44* (2013.01)

(58) Field of Classification Search
CPC ........... H02M 3/33592; H02M 1/0058; H02M 1/123; H02M 1/126; H02M 1/44
See application file for complete search history.

(56) References Cited

U.S. PATENT DOCUMENTS 10,734,886 B2 8/2020 Matsuura
12,438,439 B2 * 10/2025 Prasantanakorn .......................... H02M 3/33592
12,549,094 B2 * 2/2026 Hosotani ................. H02M 1/44
2024/0396429 A1 * 11/2024 Hung ................ H02M 3/33576

* cited by examiner

*Primary Examiner* — Adolf D Berhane
(74) *Attorney, Agent, or Firm* — Keating & Bennett, LLP

(57) ABSTRACT

A switching power supply device includes a passive EMI filter including capacitors coupled to an output terminal of the passive EMI filter and a ground, a first soft switching converter coupled to the passive EMI filter output terminal and the ground, including a primary side switching circuit coupled to the passive EMI filter output terminal, an isolation transformer including a primary winding coupled to the primary side switching circuit and a secondary winding, and a rectification circuit coupled to the secondary winding and an output terminal of the switching power supply device, and including a rectifier, and a first common-mode noise reduction path coupled between a node coupling the capacitor and the passive EMI filter output terminal and a node coupling a homonymous end of the secondary winding and the rectifier. The first common-mode noise reduction path includes an impedance.

12 Claims, 6 Drawing Sheets

SWITCHING POWER SUPPLY DEVICE

CROSS REFERENCE TO RELATED APPLICATIONS

This application claims the benefit of priority to Chinese Patent Application No. 202311345677.4 filed on Oct. 17, 2023. The entire contents of this application are hereby incorporated herein by reference.

BACKGROUND OF THE INVENTION

1. Field of the Invention

The present disclosure relates to switching power supply devices, and in particularly to switching power supply devices to reduce electromagnetic interference (EMI) in a soft switching converter.

2. Description of the Related Art

A soft switching converter is capable of providing a very low switching loss so as to facilitate a high operating frequency for a high power density switch-mode power supply design. In addition, due to the higher operating frequency, a fundamental frequency component and harmonics thereof may fall within a conducted EMI related range of 150 kHz to 30 MHz. As a noise amplitude of low harmonics is generally high, a large EMI filter may be required to suppress the noise level so as to meet the EMI standard. This is inconsistent with the high power density goal of power supply design.

SUMMARY OF THE INVENTION

In an example embodiment of the present disclosure, a switching power supply device includes a passive electromagnetic interference (EMI) filter to receive an alternating current (AC) input or a direct current (DC) input through an input terminal of the switching power supply device, the passive EMI filter including capacitors respectively coupled to an output terminal of the passive EMI filter and a ground GND, a first soft switching converter coupled to the output terminal of the passive EMI filter and the ground GND, the first soft switching converter including a primary side switching circuit coupled to the output terminal of the passive EMI filter, an isolation transformer including a primary winding coupled to the primary side switching circuit and a secondary winding, a homonymous end of the primary winding being coupled to a node coupling windings in the primary side switching circuit, and a rectification circuit coupled to the secondary winding and an output terminal of the switching power supply device, and including a rectifier, and a first common-mode noise reduction path coupled between a node that couples one of the capacitors of the passive EMI filter and the output terminal of the passive EMI filter and a node that couples a homonymous end of the secondary winding and the rectifier in the rectification circuit, wherein the first common-mode noise reduction path includes an impedance.

According to an example embodiment of the present disclosure, the impedance includes a safety capacitor coupled in series in the path.

According to an example embodiment of the present disclosure, the capacitors in the passive EMI filter may include a first capacitor and a second capacitor, and the first capacitor may be coupled between a first output terminal of the passive EMI filter and the ground GND, and the second capacitor may be coupled between a second output terminal of the passive EMI filter and the ground GND.

According to an example embodiment of the present disclosure, the first common-mode noise reduction path may be coupled to any one of the first capacitor of the passive EMI filter and the second capacitor of the passive EMI filter.

According to an example embodiment of the present disclosure, the passive EMI filter may include one or more stages of filters.

According to an example embodiment of the present disclosure, the first soft switching converter is coupled to the output terminal of the passive EMI filter via a PFC converter.

According to an example embodiment of the present disclosure, the switching power supply device may further include at least one second soft switching converter and at least one second common-mode noise reduction path corresponding to the at least one second soft switching converter. The second soft switching converter is coupled in parallel with the first soft switching converter between the output terminal of the passive EMI filter and the output terminal of the switching power supply device, and the second soft switching converter has a same configuration as the first soft switching converter, and the second common-mode noise reduction path is coupled between the node that couples one of the capacitors of the passive EMI filter and the output terminal of the passive EMI filter and a node that couples a homonymous end of a secondary winding of an isolation transformer in the second soft switching converter and a rectifier in a rectification circuit in the second soft switching converter, and the second common-mode noise reduction path has a same configuration as the first common-mode noise reduction path.

According to an example embodiment of the present disclosure, the rectification circuit may be a half-bridge rectification circuit, and the secondary winding may include two windings.

According to an example embodiment of the present disclosure, the rectification circuit may be a full-bridge synchronous rectification circuit, and the secondary winding may contain one winding.

According to an example embodiment of the present disclosure, the rectifier in the rectification circuit may include a diode or a field effect transistor.

According to an example embodiment of the present disclosure, the primary side switching circuit may have a half-bridge configuration.

According to an example embodiment of the present disclosure, the first soft switching converter may further include a filter capacitor coupled between output terminals of the switching power supply device.

The above and other elements, features, steps, characteristics and advantages of the present invention will become more apparent from the following detailed description of the example embodiments with reference to the attached drawings.

BRIEF DESCRIPTION OF THE DRAWINGS

Other characteristics, features and advantages will become clear from the following detailed description of example embodiments with reference to the accompanying drawings.

DETAILED DESCRIPTION OF THE EXAMPLE EMBODIMENTS

Hereinafter, example embodiments of the present disclosure will be described with reference to accompanying drawings. However, it will be understood that these descriptions are exemplary only and are not intended to limit the scope of the present disclosure. In addition, in the following description, descriptions of well-known structures and techniques are omitted to avoid unnecessarily confusing the concepts of example embodiments of the present disclosure.

The terms used herein are for describing the specific example embodiments only, and are not intended to limit the present disclosure. As used herein, the terms “a”, “an” and “the” should also include the meaning of “plurality” and “multiples” unless the context clearly indicates otherwise. In addition, the terms “include”, “comprise” and the like used herein indicate the existence of the stated features, steps, operations and/or components, but do not exclude the existence or addition of one or more other features, steps, operations or components.

All the terms (including technical and scientific terms) used herein have the same meaning as commonly understood by those skilled in the art in the art unless otherwise defined. It should be noted that the terms used herein should be interpreted as having a meaning consistent with the context of the present specification and should not be interpreted in an idealized or overly rigid manner.

Example embodiments of the present disclosure provide solutions to reduce common-mode noise by introducing a common-mode noise reduction path without solely relying on a passive filter. This suppresses the noise level without a need for a large EMI filter, which achieves a high power density goal of using a high operating frequency converter.

Figure 1:
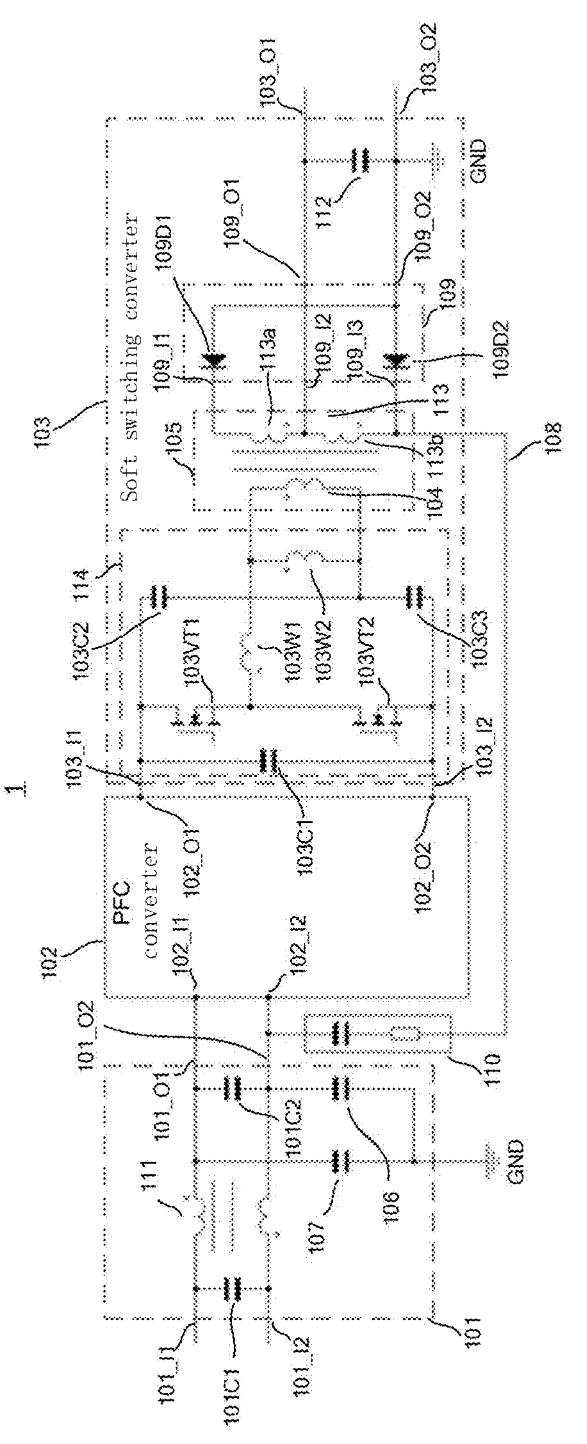
FIG. 1 shows an example of a configuration of a switching power supply device according to an example embodiment of the present invention.

Hereinafter, a circuit structure of a switching power supply device according to an example embodiment of the present disclosure will be described with reference to FIG. 1. FIG. 1 shows an example of a configuration of a switching power supply device 1 according to an example embodiment.

The switching power supply device 1 may include a passive EMI filter 101, a PFC (power factor correction) converter 102 (which may be optional), a soft switching DC-DC converter 103, and a common-mode noise reduction path 108.

The passive EMI filter is mainly used to suppress electromagnetic interference, such as electromagnetic interference (noise) in the circuit of the electronic and electrical equipment. In example embodiments of the present disclosure, the passive EMI filter may include one or more stages of filters, for example. Increasing the number of stages may improve the filter performance. For example, a plurality of stages of filters may use a plurality of stages of capacitors and a plurality of stages of inductors to provide high levels of attenuation. As shown in FIG. 1, the passive EMI filter 101 may include input terminals 101_I1 and 101_I2 and output terminals 101_O1 and 101_O2. An AC or DC input is received through the input terminals 101_I1 and 101_I2. The output terminal 101_O1 and the output terminal 101_O2 of the passive EMI filter 101 may be coupled to an input terminal 102_I1 and an input terminal 102_I2 of the PFC converter 102, respectively. As the PFC converter 102 may be optional, the output terminals 101_O1 and 101_O2 of the passive EMI filter 101 may be directly coupled to input terminals 103_I1 and 103_I2 of the soft switching DC-DC converter 103, respectively.

Further, the input terminals 101_I1 and 101_I2 of the passive EMI filter 101 may define and function as input terminals of the switching power supply device 1.

In addition, in the example shown in FIG. 1, the passive EMI filter 101 may include a common-mode inductor 111, an X capacitor 101C1, an X capacitor 101C2, and Y capacitors 106 and 107. In addition, the filter 101 may include other circuit components in addition to the circuit components described above.

The X capacitor 101C1 is coupled between the input terminals 101_I1 and 101_I2, and the X capacitor 101C2 is coupled between the output terminals 101_O1 and 101_O2. The Y capacitor 107 may be coupled between the output terminal 101_O1 and a ground GND, and the Y capacitor 106 may be coupled between the output terminal 101_O2 and the ground GND. In this example embodiment, the coupling to the ground GND may be a direct coupling, or an equivalent coupling through an electronic component with low impedance at high frequencies.

In the example shown in FIG. 1, the common-mode inductor 111 may include two coils, namely a first coil and a second coil. The first coil is coupled between the input terminal 101_I1 and the output terminal 101_O1. The second coil is coupled between the input terminal 101_I2 and the output terminal 101_O2.

In order to improve a power factor and reduce a harmonic content of an input current, a PFC converter is usually provided in the power electronic equipment for regulation so as to make the waveform of the input current “sinusoidal”. However, this is not necessary and the PFC converter may be omitted. The PFC converter 102 (which may be referred to as a PFC pre-regulator) includes input terminals 102_I1 and 102_I2, and output terminals 102_O1 and 102_O2. As described above, the input terminals 102_I1 and 102_I2 are coupled to the output terminals 101_O1 and 101_O2 of the passive EMI filter 101, respectively. The PFC converter 102 may receive the AC or DC input transmitted via the passive EMI filter 101 as a power input source through the input terminals 102_I1 and 102_I2 of the PFC converter 102.

The input terminals 103_I1 and 103_I2 of the soft switching DC-DC converter 103 are coupled to the output terminals 102_O1 and 102_O2 of the PFC converter 102, respectively. The soft switching DC-DC converter 103 may convert the output of the PFC converter 102 to a desired output and provide isolation between an input (a primary side) and an output (a secondary side). Further, the input terminals 103_I1 and 103_I2 of the soft switching DC-DC converter 103 may be directly coupled to the output terminals 101_O1 and 101_O2 of the passive EMI filter 101 respectively, without being coupled via the PFC converter.

As shown in FIG. 1, the soft switching DC-DC converter 103 may include a primary side switching circuit 114, an isolation transformer 105, an output rectification circuit 109, and a filter capacitor 112.

The primary side switching circuit 114 may have a half-bridge configuration and may include a capacitor 103C1, a capacitor 103C2, a capacitor 103C3, a field effect transistor 103VT1, a field effect transistor 103VT2, a winding 103W1, and a winding 103W2.

The capacitor 103C1 is coupled between the input terminals 103_I1 and 103_I2 of the soft switching DC-DC converter 103.

A drain of the field effect transistor 103VT1 is coupled to the input terminal 103_I1, a source of the field effect transistor 103VT1 is coupled to a drain of the field effect transistor 103VT2, and a source of the field effect transistor 103VT2 is coupled to the input terminal 103_I2. That is, the field effect transistors 103VT1 and 103VT2 coupled in series and the capacitor 103C1 are coupled in parallel between the input terminals 103_I1 and 103_I2.

Likewise, the capacitors 103C2 and 103C3 coupled in series and the capacitor 103C1 are coupled in parallel between the input terminals 103_I1 and 103_I2.

The winding 103W1 and the winding 103W2 are coupled in series between a node coupling the source of the field effect transistor 103VT1 and the drain of the field effect transistor 103VT2 and a node coupling the capacitor 103C2 and the capacitor 103C3.

The isolation transformer 105 may include a primary winding 104 and a secondary winding 113.

One terminal of the primary winding 104 (the homonymous end as shown in FIG. 1) is coupled to a node coupling the winding 103W1 and the winding 103W2, and the other terminal of the primary winding 104 is coupled to the node coupling the capacitor 103C2 and the capacitor 103C3.

In this example embodiment, the output rectification circuit 109 may be, for example, a half-bridge rectification circuit having three input terminals 109_I1, 109_I2 and 109_I3, and two output terminals 109_O1 and 109_O2.

In the case where the output rectification circuit 109 is a half-bridge rectification circuit, the secondary winding 113 may include two windings 113*a* and 113*b*, and the two windings 113*a* and 113*b* are coupled in series.

A terminal of the winding 113*a* not coupled to the winding 113*b* may be coupled to the input terminal 109_I1 of the output rectification circuit 109, a terminal of the winding 113*b* not coupled to the winding 113*a* (the homonymous end as shown in FIG. 1) may be coupled to the input terminal 109_I3, and a node coupling the winding 113*a* and the winding 113*b* may be coupled to the input terminal 109_I2.

The output rectification circuit 109 may further include a rectifier. In this example embodiment, the rectifier may be a diode. The output rectification circuit 109 may include two diodes (i.e., a diode 109_D1 and a diode 109_D2).

A cathode of the diode 109_D1 is coupled to the input terminal 109_I1, and an anode of the diode 109_D1 is coupled to the output terminal 109_O2.

Similarly, a cathode of the diode 109_D2 is coupled to the input terminal 109_I3, and an anode of the diode 109_D1 is coupled to the output terminal 109_O2.

Further, the input terminal 109_I2 of the output rectification circuit 109 is coupled to the output terminal 109_O1.

The output terminals 109_O1 and 109_O2 of the output rectification circuit 109 may be coupled to output terminals 103_O1 and 103_O2 of the soft switching DC-DC converter 103, respectively.

The output terminals 103_O1 and 103_O2 of the soft switching DC-DC converter 103 may define and function as output terminals of the switching power supply device 1.

The filter capacitor 112 may be coupled between the output terminals 103_O1 and 103_O2 of the soft switching DC-DC converter 103, and a node coupling the filter capacitor 112 and the output terminal 103_O2 may be coupled to the ground GND.

Generally, one of the main sources of the common-mode noise current is generated by a switching voltage on the primary winding 104 of the isolation transformer 105. The common-mode noise current is coupled to the grounded secondary side through a winding capacitor of the transformer, and then returns to the primary side by means of a ground coupling and the Y capacitors 106 and 107 in the passive EMI filter 101. A path of the common-mode noise current will be shown in FIG. 3 described later.

With continued reference to FIG. 1, one terminal of the common-mode noise reduction path 108 may be coupled to a node coupling the output terminal 101_O2 of the passive EMI filter 101 and the Y capacitor 106 of the passive EMI filter 101 (i.e., coupled to the Y capacitor 106), and the other terminal of the common-mode noise reduction path 108 may be coupled to a node coupling the homonymous end of the secondary winding 113 of the isolation transformer 105 and a rectifier of the output rectification circuit 109 (i.e., coupled to a node coupling the homonymous end of the winding 113*b* and the cathode of the diode 109_D2).

In this example embodiment, the common-mode noise reduction path 108 may include an impedance 110.

Through the above circuit structure, it is possible for the common-mode noise reduction path 108 to be coupled from the cathode of the diode 109_D2 (the soft switching provides a very good scaled replica of a switching voltage signal of the primary winding 104 at the cathode of the diode 109_D2) to the Y capacitor 106 through the impedance 110, so that a current generated in the path and the common-mode noise current are out of phase.

In addition, impedance 110 may include a safety Y capacitor coupled in series in the path to meet Safety isolation requirements, and an impedance value may be adjustable, so that the amplitude of the noise reduction current may be similar to that of the common-mode noise current, so as to reduce or minimize the obtained common-mode noise amplitude.

It should be noted that common-mode noise reduction path 108 may be coupled to either the Y capacitor 106 or the Y capacitor 107 to provide a similar noise reduction effect.

Figure 3:
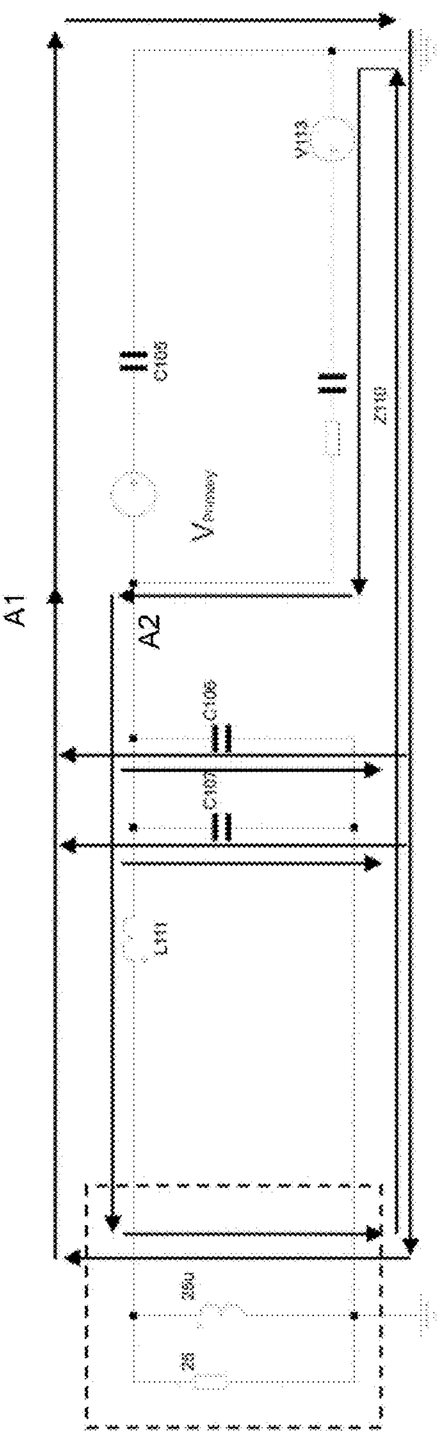
FIG. 3 shows an equivalent circuit of the switching power supply device shown in FIG. 1 according to an example embodiment of the present invention.

FIG. 3 shows an equivalent circuit of the switching power supply device shown in FIG. 1 according to an example embodiment. As shown in FIG. 3, the clockwise arrow A1 represents a common-mode noise current path generated by the primary side switching circuit (where "Vprimary" represents the source generating the common-mode noise current), and the counterclockwise arrow A2 represents a noise elimination current generated by an elimination source V113 (which is a switching voltage across the winding 113*b*).

Impedance Z110 ("110") may be adjusted to control an amplitude of the noise elimination current to counteract the noise current generated by the primary switching circuit (i.e. the primary side switching circuit).

C105 represents a winding parasitic capacitor between the primary winding 104 of the isolation transformer 105 and the secondary winding 113 of the isolation transformer 105. The X capacitors of the input filter and the filter capacitor 112 are equivalent as short circuits in an EMI relevant frequency range.

Figure 2:
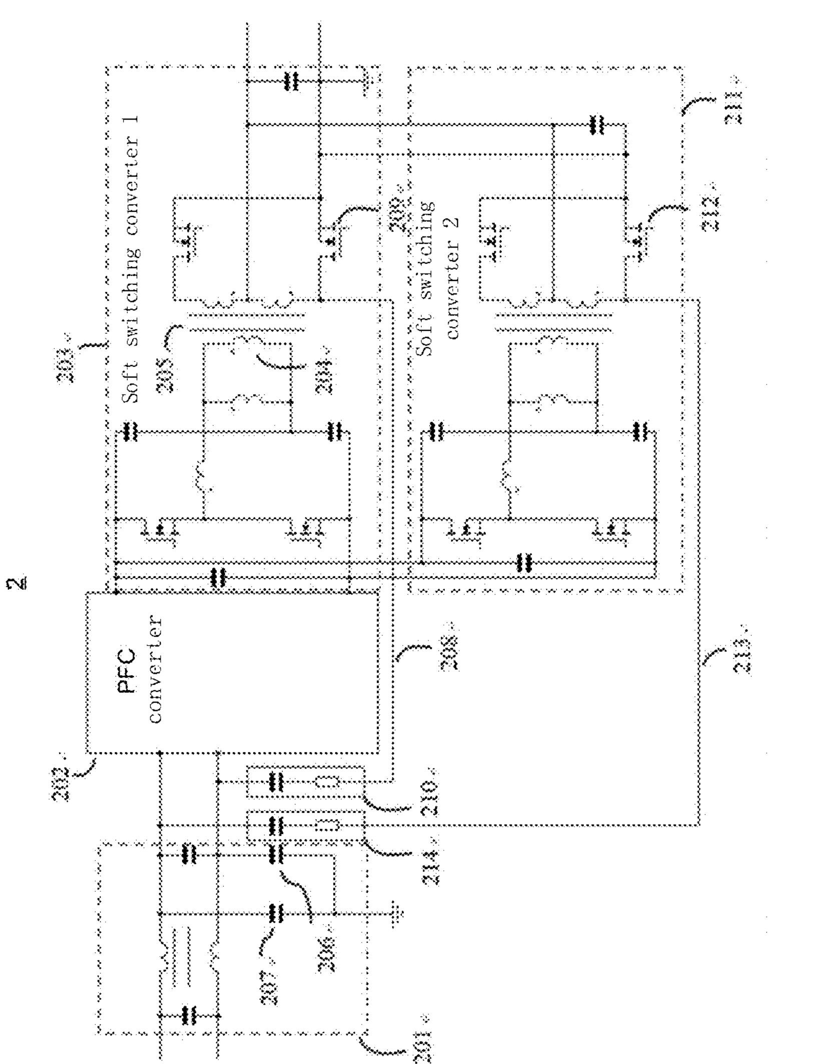
FIG. 2 shows another example of a configuration of a switching power supply device according to an example embodiment of the present invention.

Based on the configuration shown in FIG. 1, FIG. 2 shows another example of a configuration of a switching power supply device according to an example embodiment. As shown in FIG. 2, the circuit structure of the switching power supply device 2 is similar to the circuit structure of the switching power supply device 1 shown in FIG. 1, except that one more soft switching converter 211 operating in parallel is added for higher power applications.

In this example embodiment, the soft switching converter 211 may have a configuration substantially the same as or similar to that of the soft switching converter 203.

In addition, it should be noted that the rectifiers in the output rectification circuits of the soft switching converters 203 and 211 are not limited to diodes, but may be any rectification circuits, including synchronous rectifiers 209 and 212 (e.g., field effect transistors) shown in FIG. 2.

As shown in FIG. 2, the soft switching DC-DC converters are provided with common-mode noise reduction paths 208 and 213 respectively and impedances 214 and 210 respectively with reference to the description of the common-mode noise reduction path 108 shown in FIG. 1, so as to achieve the common-mode noise reduction described above.

Based on example embodiments according to the single soft switching DC-DC converter shown in FIG. 1 and the two soft switching DC-DC converters shown in FIG. 2, the number of soft switching DC-DC converters in example embodiments of the present disclosure may be increased to any number.

Figure 4:
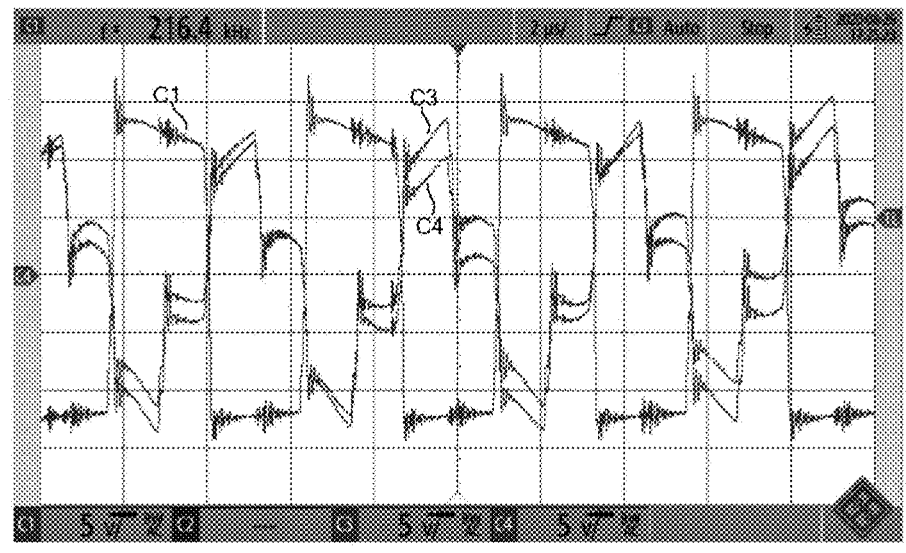
FIG. 4 shows practical waveforms implemented by a switching power supply device without a common-mode noise reduction path.

FIG. 4 shows practical waveforms implemented by a switching power supply device without a common-mode noise reduction path. Specifically, FIG. 4 shows waveforms implemented by the switching power supply device 2 shown in FIG. 2 without the common-mode noise reduction paths 208 and 213.

Channel 1 (C1) represents a waveform, measured at a drain of 209 shown in FIG. 2, with respect to ground. Channel 3 (C3) and channel 4 (C4) respectively represent a voltage waveform measured across the Y capacitor 206 and a voltage waveform measured across the Y capacitor 207 shown in FIG. 2, which reflect amplitudes and waveforms of common-mode noise currents.

Figure 5:
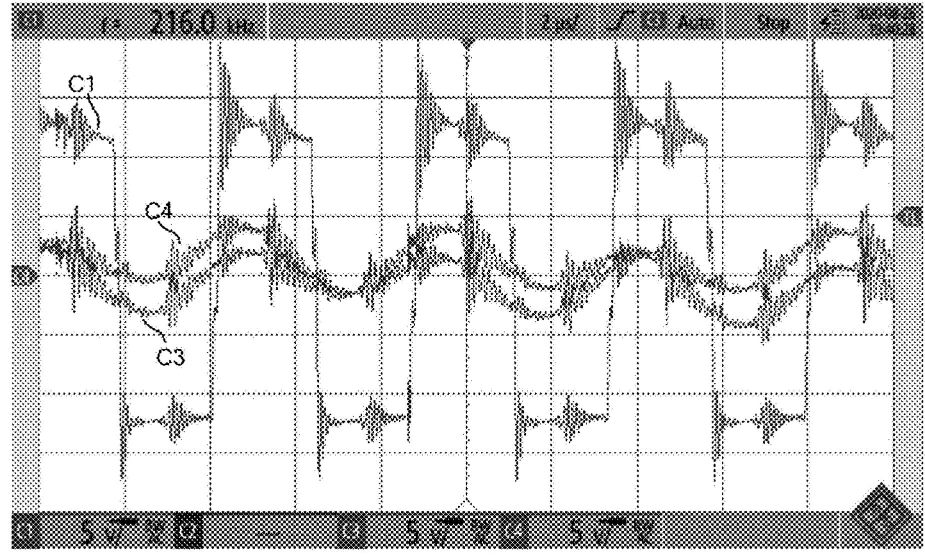
FIG. 5 shows practical waveforms implemented by a switching power supply device with a common-mode noise reduction path according to an example embodiment of the present invention.

FIG. 5 shows practical waveforms implemented by a switching power supply device with a common-mode noise reduction path according to an example embodiment. Specifically, FIG. 5 shows waveforms implemented by the switching power supply device with the common-mode noise reduction paths 208 and 213. Impedances 210 and 214 may be adjusted to obtain minimum noise voltages across the Y capacitor 206 and across the Y capacitor 207. It may be seen from FIG. 5 that a level of the common-mode noise voltage is significantly reduced.

Figure 6:
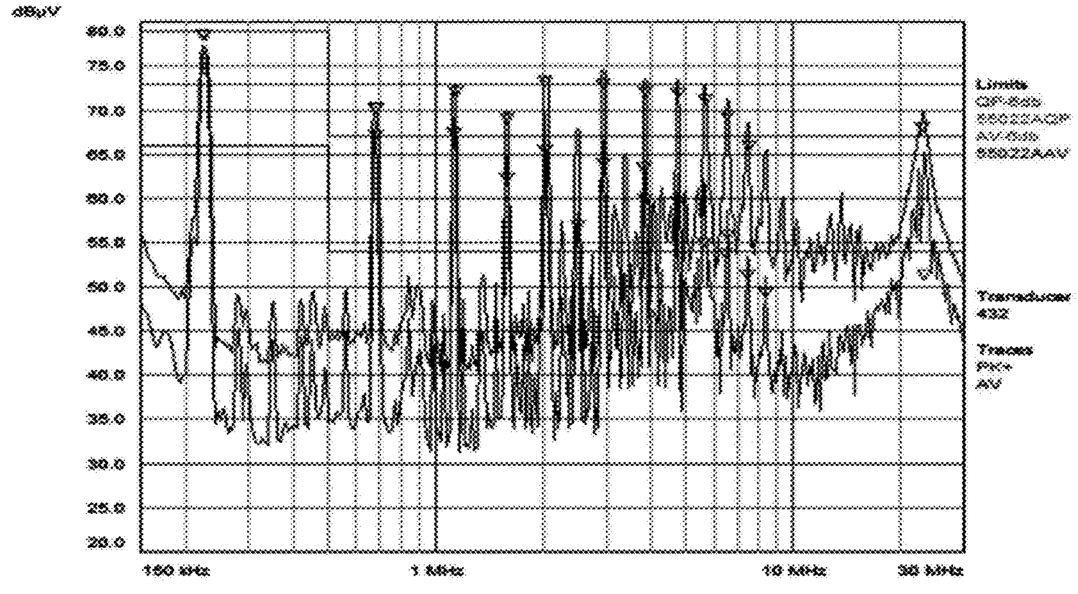
FIG. 6 and FIG. 7 respectively show EMI measurement results before and after implementation of an example embodiment of the present invention.
Figure 7:
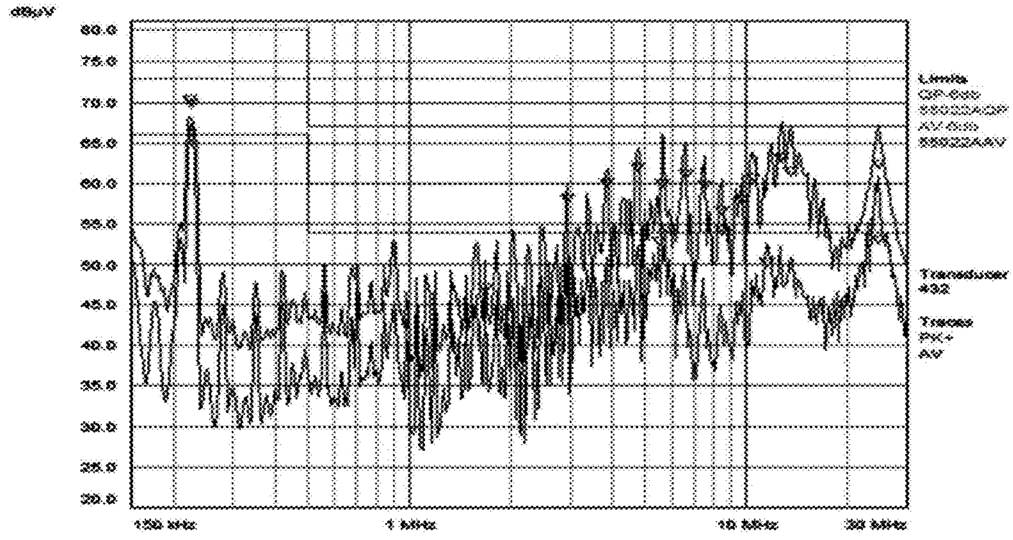

Further, FIG. 6 shows an EMI measurement result before implementation of the present disclosure, and FIG. 7 shows an EMI measurement result after implementation of the present disclosure. By comparing FIG. 6 and FIG. 7, it may be known that an EMI noise level is significantly reduced, including a fundamental frequency component around 230 kHz of the soft switching converter. For example, a noise level of the fundamental frequency component in FIG. 6 is approximately 78 (dBuV), and a noise level of the fundamental frequency component in FIG. 7 is reduced to approximately 68 (dBuV).

Figure 8:
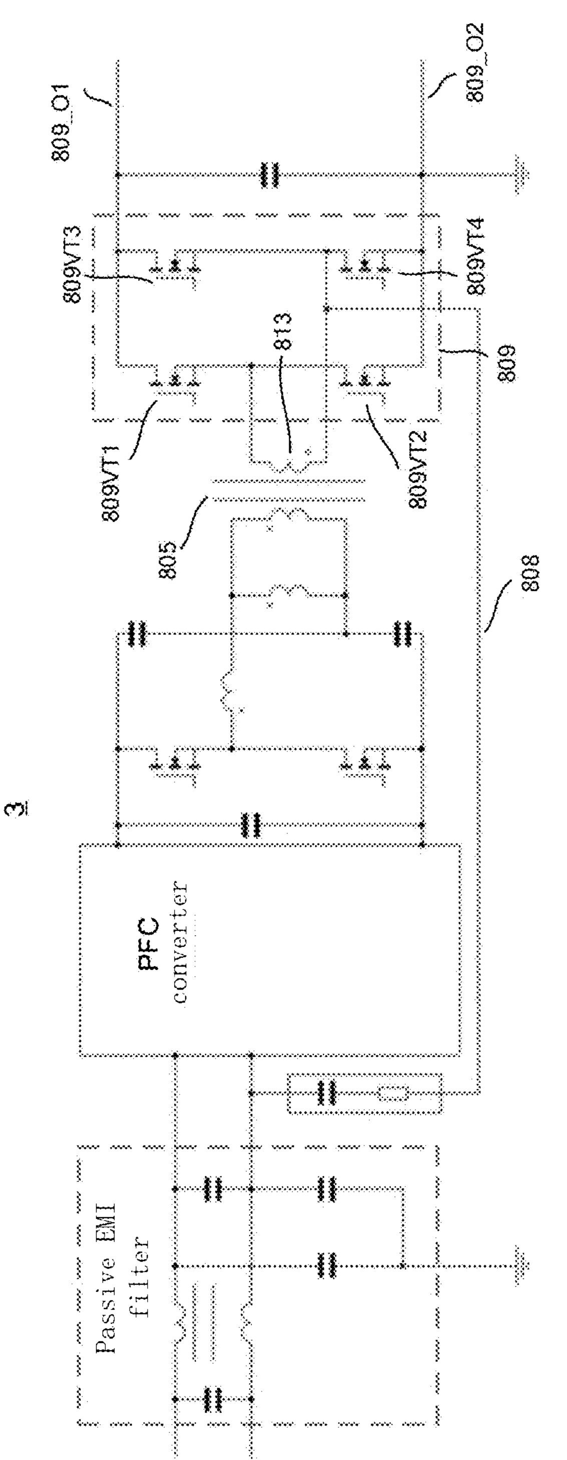
FIG. 8 shows another example of a configuration of a switching power supply device according to an example embodiment of the present invention.

FIG. 8 shows another example of a configuration of a switching power supply device according to an example embodiment.

In this example embodiment, circuit elements of the switching power supply device 3 are substantially the same as the circuit elements of the switching power supply device 1 described with reference to FIG. 1, except that an output rectification circuit 809 is changed to a full-bridge synchronous rectification. Accordingly, a secondary winding 813 of an isolation transformer 805 has one winding.

As shown in FIG. 8, the output rectification circuit 809 may include 4 rectifiers, which may be implemented using diodes or any rectification circuits. In this example embodiment, the rectifier may be, for example, a field effect transistor.

A drain of a field effect transistor 809VT1 is coupled to an output terminal 809_O1 of the output rectification circuit 809, a source of the field effect transistor 809VT1 is coupled to a drain of a field effect transistor 809VT2, and a source of the field effect transistor 809VT2 is coupled to an output terminal 809_O2 of the output rectification circuit 809.

Likewise, a drain of a field effect transistor 809VT3 is coupled to the output terminal 809_O1 of the output rectification circuit 809, a source of the field effect transistor 809VT3 is coupled to a drain of a field effect transistor 809VT4, and a source of the field effect transistor 809VT4 is coupled to the output terminal 809_O2 of the output rectification circuit 809.

In addition, one terminal (non-homonymous end) of the secondary winding 813 of the isolation transformer 805 may be coupled to a node coupling the source of the field effect transistor 809VT1 and the drain of the field effect transistor 809VT2, and the other terminal (a homonymous end) of the secondary winding 813 may be coupled to a node coupling the source of the field effect transistor 809VT3 and the drain of the field effect transistor 809VT4.

One terminal of a common-mode noise reduction path 808 is coupled to a node coupling the homonymous end of the secondary winding 813 and the node that couples the source of the field effect transistor 809VT3 and the drain of the field effect transistor 809VT4, and the other terminal of the common-mode noise reduction path 808 is coupled to the output terminal of the passive EMI filter.

Likewise, although FIG. 8 shows one soft switching converter, the present disclosure is not limited thereto, and the number of soft switching converters may be any number. Furthermore, the primary side switching circuit is not limited to a half-bridge configuration either, and may be any configuration capable of operating with soft switching.

By using example embodiments of the present disclosure, the impedance in the common-mode noise reduction path may be adjusted, so that an amplitude of the noise reduction current may be similar to that of the common-mode noise current, so as to reduce or minimize the obtained common-mode noise amplitude.

Example embodiments of the present disclosure have been described in detail above with reference to the accompanying drawings, but the specific structure is not limited to the above example embodiments. References of "one example embodiment," "an example embodiment," etc. in the present disclosure indicate that the described example embodiment(s) may include particular features, structures, or characteristics, but not each example embodiment have to include the particular features, structures, or characteristics. In addition, such phrases are not necessarily referring to the same example embodiment. In addition, when a particular feature, structure, or characteristic is described in conjunction with an example embodiment, it should be considered that it is within the knowledge of those skilled in the art to implement such feature, structure, or characteristic in conjunction with other example embodiments (whether or not explicitly described).

It will be understood that, although terms "first," "second," etc. may be used herein to describe various elements, these elements should not be limited by these terms. These terms are only used to distinguish one element from another. For example, without departing from the scope of the present disclosure, a first element could be named as a second element, and, similarly, a second element could be named as a first element. As used herein, the term "and/or" includes any and all combinations of one or more of the associated listed items.

Lots of changes and modifications may be made to example embodiments without departing from the inventive concept of the present disclosure substantially. All such changes and modifications are intended to be included within the scope of the inventive concepts in the present disclosure. Therefore, the above-described subject matter is to be construed as illustrative and not restrictive, and the examples of example embodiments are intended to cover all such modifications, enhancements, and other example embodiments that fall within the spirit and scope of the inventive concept. Therefore, to the maximum extent allowed by law, the scope of the inventive concepts should be determined by the broadest permissible interpretation of the present disclosure including examples of example embodiments and their equivalents, and shall not be restricted or limited to the foregoing specific example embodiments.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply device, comprising:

a passive electromagnetic interference (EMI) filter to receive an alternating current (AC) input or a direct current (DC) input through an input terminal of the switching power supply device, the passive EMI filter including capacitors respectively coupled to an output terminal of the passive EMI filter and a ground GND;

a first soft switching converter coupled to the output terminal of the passive EMI filter and the ground GND, the first soft switching converter including:

a primary side switching circuit coupled to the output terminal of the passive EMI filter;

an isolation transformer including a primary winding coupled to the primary side switching circuit and a secondary winding, a homonymous end of the primary winding being coupled to a node coupling windings in the primary side switching circuit; and a rectification circuit coupled to the secondary winding and an output terminal of the switching power supply device, and including a rectifier; and a first common-mode noise reduction path coupled between a node that couples one of the capacitors of the passive EMI filter and the output terminal of the passive EMI filter and a node that couples a homonymous end of the secondary winding and the rectifier in the rectification circuit; wherein the first common-mode noise reduction path includes an impedance.

2. The switching power supply device according to claim 1, wherein the impedance includes a safety capacitor coupled in series in the first common-mode noise reduction path.

3. The switching power supply device according to claim 1, wherein the capacitors in the passive EMI filter include a first capacitor and a second capacitor; and the first capacitor is coupled between a first output terminal of the passive EMI filter and the ground GND, and the second capacitor is coupled between a second output terminal of the passive EMI filter and the ground GND.

4. The switching power supply device according to claim 3, wherein the first common-mode noise reduction path is coupled to one of the first capacitor of the passive EMI filter and the second capacitor of the passive EMI filter.

5. The switching power supply device according to claim 4, wherein the passive EMI filter includes one or more stages of filters.

6. The switching power supply device according to claim 1, wherein the first soft switching converter is coupled to the output terminal of the passive EMI filter via a PFC converter.

7. The switching power supply device according to claim 1, further comprising at least one second soft switching converter and at least one second common-mode noise reduction path corresponding to the at least one second soft switching converter; wherein the second soft switching converter and the first soft switching converter are coupled in parallel between the output terminal of the passive EMI filter and the output terminal of the switching power supply device, and the second soft switching converter has a same configuration as the first soft switching converter;

the second common-mode noise reduction path is coupled between the node that couples one of the capacitors of the passive EMI filter and the output terminal of the passive EMI filter and a node that couples a homonymous end of a secondary winding of an isolation transformer in the second soft switching converter and a rectifier in a rectification circuit in the second soft switching converter; and the second common-mode noise reduction path has a same configuration as the first common-mode noise reduction path.

8. The switching power supply device according to claim 1, wherein the rectification circuit is a half-bridge rectification circuit, and the secondary winding includes two windings.

9. The switching power supply device according to claim 1, wherein the rectification circuit is a full-bridge synchronous rectification circuit, and the secondary winding contains one winding.

10. The switching power supply device according to claim 1, wherein the rectifier in the rectification circuit includes a diode or a field effect transistor.

11. The switching power supply device according to claim 1, wherein the primary side switching circuit has a half-bridge configuration.

12. The switching power supply device according to claim 1, wherein the first soft switching converter includes a filter capacitor coupled between output terminals of the switching power supply device.

* * * * *